United States Patent [19]
Park

[11] Patent Number: 6,145,538
[45] Date of Patent: *Nov. 14, 2000

[54] FLOW CONTROL VALVE EMPLOYING A STEP MOTOR

[75] Inventor: Rae-Soo Park, Kyonggi-do, Rep. of Korea

[73] Assignee: Samsung Electronics Co., Ltd., Kyungki-Do, Rep. of Korea

[ * ] Notice: This patent is subject to a terminal disclaimer.

[21] Appl. No.: 09/290,198

[22] Filed: Apr. 13, 1999

[30] Foreign Application Priority Data

Apr. 13, 1998 [KR] Rep. of Korea ...................... 98-13062

[51] Int. Cl.$^7$ .................................................. F16K 37/00
[52] U.S. Cl. ................... 137/554; 251/120; 251/129.11; 251/263; 251/249.5; 251/335.3
[58] Field of Search ........................ 251/129.12, 129.05, 251/129.11, 249.5, 335.3, 324, 325, 120, 263; 137/554

[56] References Cited

U.S. PATENT DOCUMENTS

| | | | |
|---|---|---|---|
| 1,903,229 | 3/1933 | Colman et al. .......................... | 251/263 |
| 4,040,445 | 8/1977 | McCormick ........................ | 251/335.3 |
| 4,176,687 | 12/1979 | Ensign ................................ | 251/129.12 |
| 4,556,193 | 12/1985 | Yoshiga ............................... | 251/129.11 |
| 4,664,356 | 5/1987 | Becker et al. ........................... | 251/175 |

*Primary Examiner*—Kevin Shaver
*Assistant Examiner*—Eric Keasel
*Attorney, Agent, or Firm*—Sughrue, Mion, Zinn, Macpeak & Seas, PLLC

[57] ABSTRACT

A flow control valve employing a step motor includes a valve housing having liquid inlet and outlet passageways, and a guide space which is communicated with the liquid inlet and outlet passageways, a spool which is connected to be movable up and down to the guide space of the valve housing so as to control an openness of the outlet passageway, a spool guide which is accommodated in an upper portion of the guide space so as to flow a refrigerant liquid downward by being moved together with the spool, an elastic support which elastically supports the spool guide in one direction, a seal member which is connected to a lower end portion of the valve housing, wrapping around a lower portion of the spool, so as to prevent a leakage of the refrigerant liquid, and a driving mechanism having a step motor to move the spool up and down, in which employing a dilatant liquid and a diaphram is eliminated and a proportional control is enabled, to thereby enhance the flow control performance and a durability of the valve.

11 Claims, 6 Drawing Sheets

FLOW CONTROL VALVE EMPLOYING A STEP MOTOR

BACKGROUND OF THE INVENTION

1. Field of the Invention

The present invention relates to a flow control valve adopted to a refrigerating cycle, and more particularly, to a flow control valve in which a proportional control is enabled by employing a step motor, to thereby enhance flow control performance and durability.

2. Description of the Related Art

Generally, refrigerating cycles include an evaporator, a compressor, a condenser, and an expansion valve and so on, and serve to lower the ambient temperature by the evaporation, compression, condensation, and expansion of refrigerants.

In detail, the refrigerant liquid in the evaporator is evaporated, and the refrigerant liquid takes the heat required for such an evaporation from the air surrounding the cooling pipe. Then, the air is cooled down, which maintains the inside of the container at a low temperature by natural convection or a fan. The refrigerant liquid provided from the expansion valve and the vapour of the evaporated refrigerant coexist inside of the evaporator, and there is a certain relation between the evaporation pressure and the evaporation temperature during the liquid changes to the vapour.

The vapour of the refrigerant liquid is taken into the compressor, to thereby maintain a low pressure of the refrigerant in the evaporator. As a result, the refrigerant liquid can actively evaporate even at a low temperature. The vapour of the refrigerant taken into the compressor is compressed by a piston inside of a cylinder, thereby is provided with a high pressure. Thus, the vapour may be easily liquefied by a cooling water or a cooling air at the normal temperature.

The compressed gas from the compressor is cooled and liquefied by the condenser. Similar to the evaporation described above, the refrigerant liquid and the vapour of the refrigerant liquid coexist and there is a certain relation between the condensation pressure and the condensation temperature during the vapour changes to the liquid.

An expansion is for lowering the pressure of the refrigerant which is liquefied by the condenser, to be easily evaporated prior to the submittal of the refrigerant to the evaporator. The expansion valve reduces the pressure and controls the amount of the refrigerant liquid.

That is, the amount of the refrigerant liquid to be evaporated in the evaporator is determined by the amount of the heat to be removed in the container at a predetermined evaporation temperature (pressure). Therefore, it is extremely significant to precisely provide and control the amount of the refrigerant liquid in the evaporator.

The expansion valve adiabatically expands the refrigerant liquid at a high temperature and pressure to a low temperature and pressure by throttling, and serves as a flow control valve for maintaining an appropriate amount of refrigerant according to the load of the evaporator.

Expansion valves may be classified into various types according to the operating method and structure. Of recent interest is, the thermocompression type flow control valve which costs less, has an excellent driving force, and for which a fine driving is enabled. An example of such a thermocompression type flow control valve will be explained with reference to the attached drawings.

As shown in FIG. 1, the flow control valve includes a cap 1, a plate 3 which is made up of a ceramic and has dilatant liquid injection openings 2, an aluminum(Al) electrode 5 which has at the medial portion thereof a tantalum(Ta)—Al heating electrode 4 so as to fixed onto the heating plate 3, a diaphram 7 which is made up of a copper(Cu), for example, and which is fixed onto Al electrode 5 with a spacer 6 inserted therebetween, adhesive layers (also referred to as "fillers") 8 and 9 which are inserted between the upper surface of Al electrode 5 and the bottom surface of spacer 6, and the upper surface of spacer 6 and the bottom surface of diaphram 7, respectively, so as to enhance an adhesion, a dilatant liquid 10 which fills the space between Al electrode 5 and diaphram 7, and sealing bottom plate 11 which is fixed at the bottom surface of plate 3 so as to close dilatant liquid injection openings 2.

Reference numeral 12 denotes a power supply line.

Cap 1 has a space portion 1a through which the refrigerant liquid flows, and a liquid inlet passageway 1b and a liquid outlet passageway 1c which communicate with space portion 1a.

In constructing such a thermocompression type flow control valve, Al electrode 5 having Ta—Al heating electrode 4 is fixed onto plate 3, and adhesive layer 8, spacer 6, adhesive layer 9, and diaphram 7 are sequentially fixed onto Al electrode 5, to thereby form a predetermined space within Al electrode 5, spacer 6, and diaphram 7, respectively.

Subsequently, dilatant liquid 10 is injected via dilatant liquid injection openings 2, and sealing bottom plate 11 is fixed to the bottom surface of plate 3 so as to close dilatant liquid injection openings 2. Then, sealing bottom plate 11 is fixed to the bottom surface of cap 1, and power supply line 12 of Al electrode 5 is led out toward the outside of cap 1.

Here, diaphram 7 has to be positioned in such a manner that the center portion thereof is positioned directly under liquid outlet passageway 1c of cap 1.

In such a conventional flow control valve, the refrigerant liquid flows in via liquid inlet passageway 1b, passes through space portion 1a, and flows out toward the evaporator via liquid outlet passageway 1c. When it is necessary to control the quantity of the refrigerant liquid, a power is applied to Al electrode 5 via power supply line 12, and Ta—Al heating electrode 4 of Al electrode 5 emits a heat. Then, dilatant liquid 10 which fills Al electrode 5, spacer 6, and diaphram 7 expands. As a result, as shown in FIG. 2, diaphram 7 expands at the center thereof toward liquid outlet passageway 1c of cap 1. Ultimately, the quantity of the refrigerant liquid which flows out via liquid outlet passageway 1c is controlled, to thereby control an overall liquid flow.

However, in such a conventional thermocompression pressure type flow control valve, the quantity of the liquid is controlled by expanding dilatant liquid 10 by heating Ta—Al heating electrode 4, and a proportional control is not allowed. In addition, there some disadvantages to overcome due to the use of dilatant liquid 10.

In other words, a seal to completely prevent leakages of dilatant liquid 10 is not easily, and a low durability of diaphram 7 is caused by the repeated expansion and contraction of dilatant liquid 10. As a result, reliability of the flow control valve is degraded, and an overall lifespan of the valve is reduced.

SUMMARY OF THE INVENTION

It is therefore an object of the present invention to provide a flow control valve employing a step motor in which the flow control is enhanced by a proportional control.

It is another object of the present invention to provide a flow control valve employing a step motor of which durability is enhanced by excluding a dilatant liquid and a diaphram.

To achieve the above objects and other advantages, there is provided a flow control valve employing a step motor including: a valve housing having liquid inlet and outlet passageways, and a guide space which is communicated with the liquid inlet and outlet passageways; a spool which is connected to be movable up and down to the guide space of the valve housing so as to control the degree of the openness of the outlet passageway; a spool guide which is accommodated in the upper portion of the guide space so as to flow the refrigerant liquid downward by being moved according to the spool; a supporting means which elastically supports the spool guide in one direction; a seal means which is connected to the lower end portion of the valve housing, wrapping around the lower portion of the spool, so as to prevent a leakage of the refrigerant liquid; and a driving means having a step motor for moving the spool up and down.

According to an embodiment of the spool guide, a plurality of liquid passage grooves are formed at the periphery thereof.

According to another embodiment of the spool guide, a plurality of penetrating holes for passage of liquid are formed spaced apart from the center thereof.

The liquid inlet passageway and the guide space are formed in the same axis, while the liquid outlet passageway is formed perpendicularly to the guide space. The liquid inlet and outlet passageways have at the inner end portions thereof holes having a diameter smaller than those of the liquid inlet and outlet passageways and which are communicated with the guide space, respectively.

Preferably, the seal means is a bellows which is fixed to the lower end of the valve housing and wraps around the lower portion of the spool.

One preferable embodiment of the driving means includes a step motor, a gear train for transmitting the rotation force of the step motor, and a cam for moving the spool up and down, while the cam is rotated according to the gear train.

Another preferred embodiment of the driving means includes a bracket for supporting the lower portion of the valve housing, a step motor which is fixed to a predetermined portion of the bracket, a first gear which is connected to the step motor, a second gear having integrally-formed large and small gears and which is connected to the bracket and rotates by the first gear, a third gear which is connected to the bracket and rotates by the second gear, a cam being formed integrally with the third gear so as to move the spool combined with the bellows, and a cam position sensing means which senses the position of the cam.

Preferably, either the periphery of the cam, or the lower surface of the bellows is coated with $MOS_2$ in order to reduce the friction factor therebetween.

The cam position sensing means is composed of a sensing switch fixed at a predetermined portion of the bracket, and a projection plate which is formed on the third gear towards the bracket and operates the sensing switch as the third gear rotates.

The bracket has at a lower portion thereof a bent portion to which a shaft guide for supporting a rotation shaft of the step motor is fixed.

BRIEF DESCRIPTION OF THE DRAWINGS

The above object and other advantages of the present invention will become more apparent by describing in detail the preferred embodiments thereof with reference to the accompanying drawings, in which:

wherein, FIG. 1 is a section view illustrating a state where the dilatant liquid is not expanded, and FIG. 2 is a section view illustrating a state where the diaphram is swelled out by the expansion of the dilatant liquid;

wherein, FIG. 4 is a partial section view illustrating the maximum open state of the valve, and FIG. 5 is a partial section view illustrating the maximum closed state of the valve;

DETAILED DESCRIPTION OF THE PREFERRED EMBODIMENTS

Figure 1:
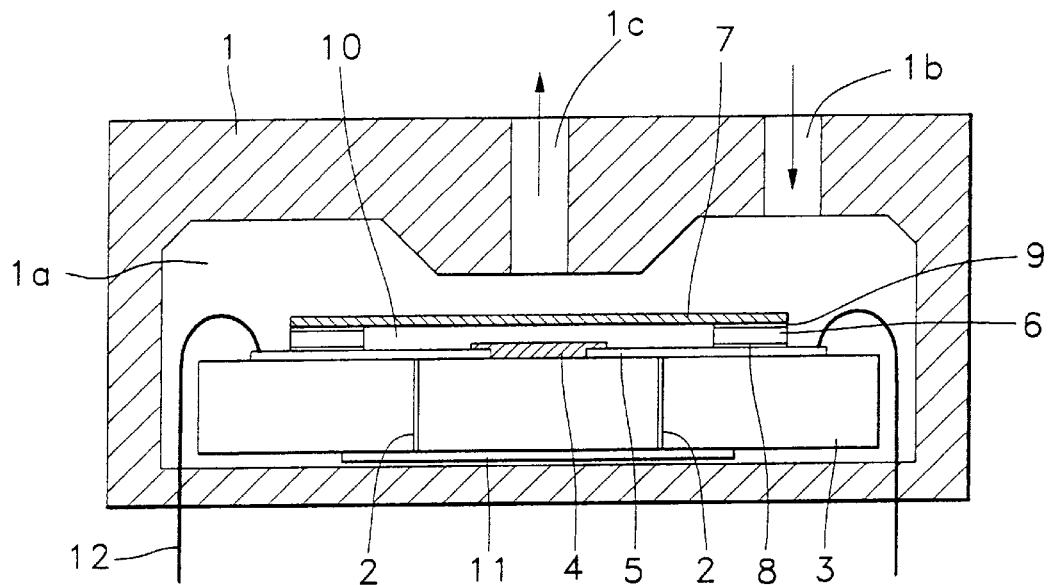
FIGS. 1 and 2 illustrate the construction and operation of a conventional flow control valve.
Figure 2:
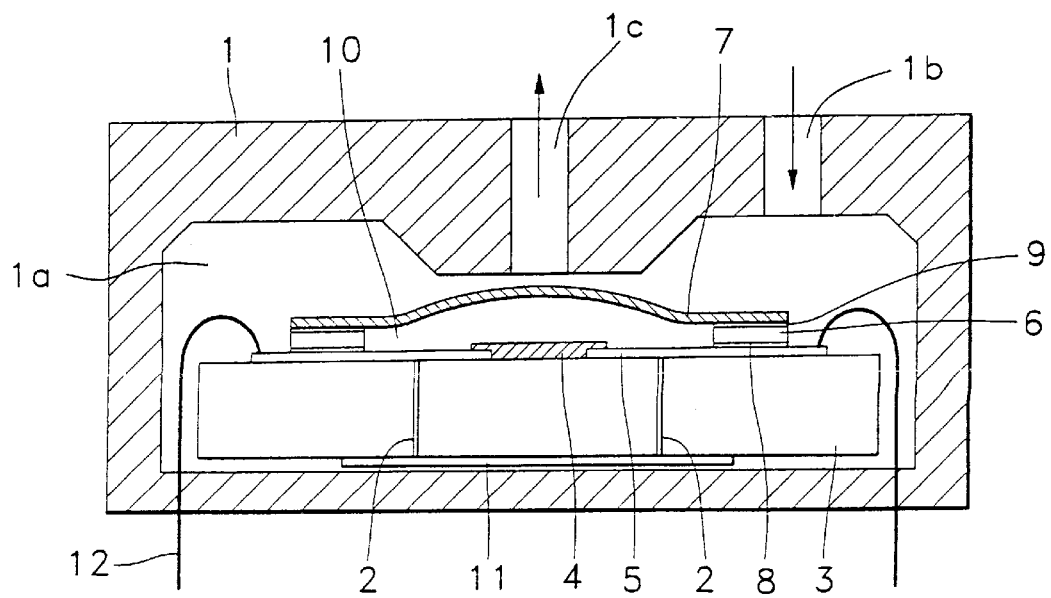
Figure 3:
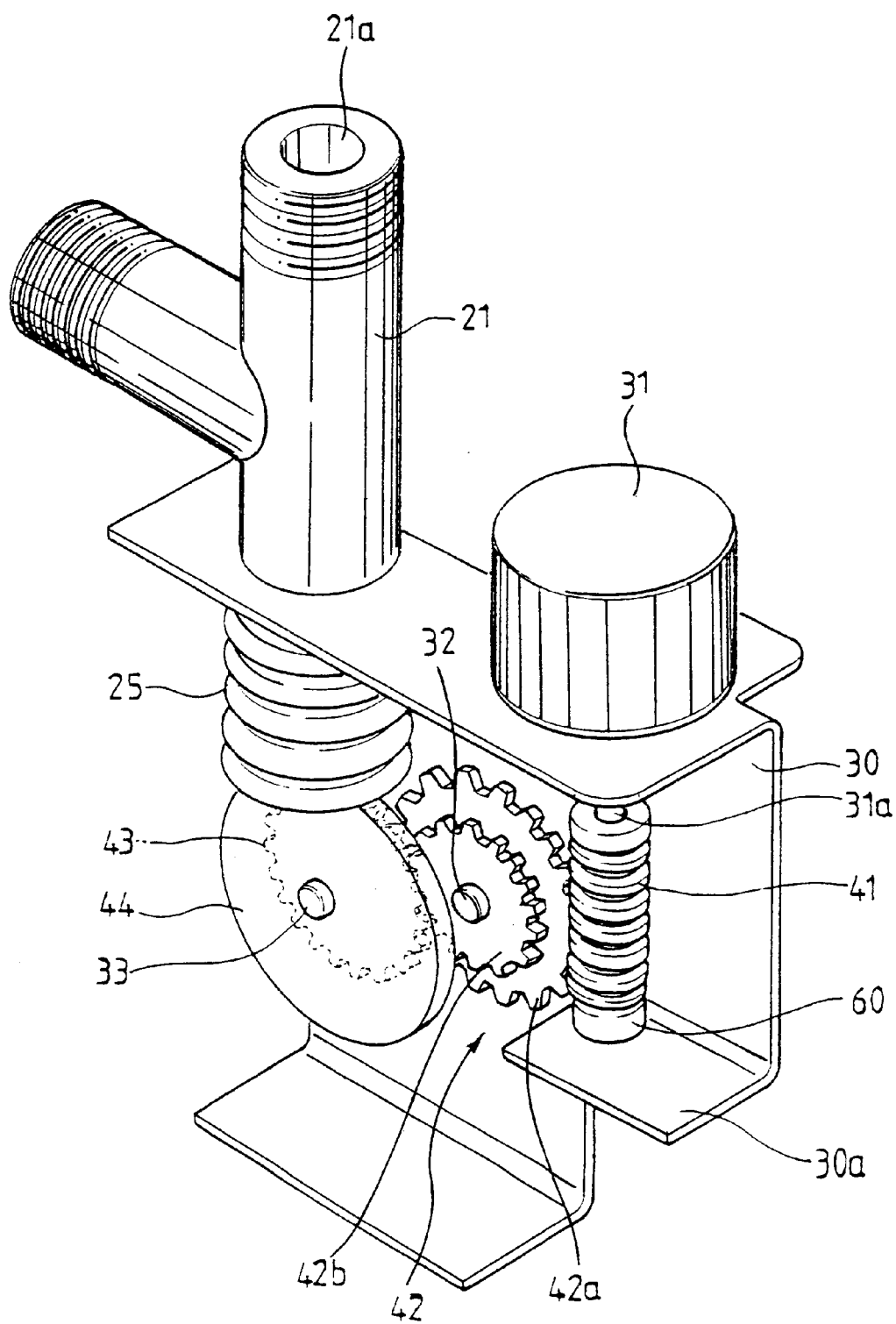
FIG. 3 is a perspective view illustrating a flow control valve using a step motor according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skills in the art.

Referring to FIGS. 3 to 7, the flow control valve of the present invention includes: a valve housing 21 having a liquid inlet passageway 21a, a liquid outlet passageway 21b, and a guide space 21c which is communicated with liquid inlet and outlet passageways 21a and 21b; a spool 22 which is connected to be movable up and down to guide space 21c of valve housing 21 and which controls the degree of the openness of liquid outlet passageway 21b; a spool guide 23 which is accommodated into the upper portion of guide space 21c and moves up and down together with spool 22 so as to flow the refrigerant liquid downward; a supporting member which is accommodated into the upper portion of spool guide 23 so as to elastically support spool guide 23; a seal means which is connected to the lower end portion of valve housing 21, wrapping around the lower portion of spool 22, so as to prevent a leakage of the refrigerant liquid; and a driving means having a step motor 31 for moving spool 22 up and down.

Liquid inlet passageway 21a and guide space 21c are formed in the same axis, while liquid outlet passageway 21b is formed perpendicularly to guide space 21c. Liquid inlet and outlet passageways 21a and 21b have at the inner end portions thereof inlet hole 21a' and outlet hole 21b' which are communicated with guide space 21c, respectively.

Figure 8:
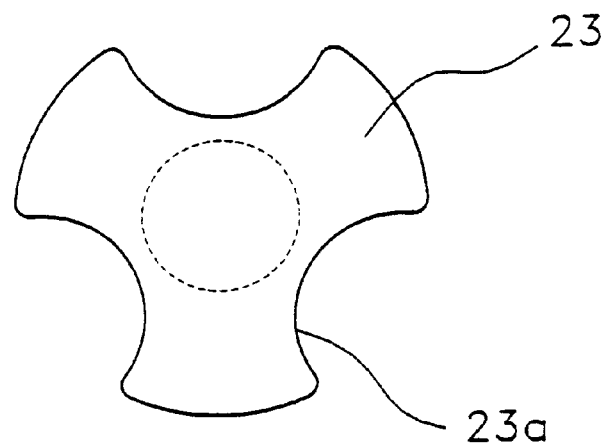
FIGS. 8 and 9 are plan views showing embodiments of spool guides of the flow control valve according to the present invention.

As shown in FIG. 8, spool guide 23 has at the periphery thereof a plurality of liquid passage grooves 23a which are separated from each other by a predetermined space.

Figure 9:
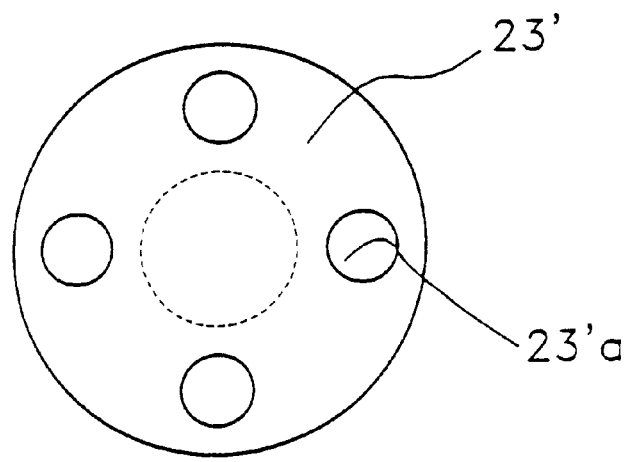

The shape of the spool guide 23 is not limited to those as shown in FIG. 8. Therefore, as shown in FIG. 9, a plurality of liquid passage holes 23' a are formed at a spool guide 23' to be separated from each other by a predetermined space.

Preferably, the supporting means is a compression coil spring 24 of which an upper end portion is supported by a rise portion 21d in guide space 21c and lower end portion is supported by the upper surface of spool guide 23, to thereby provide an elastic support to spool guide 23.

Therefore, if a large quantity of refrigerant liquid flows into liquid inlet passageway 21a by the descending of spool 22, spool guide 23 is lowered by the pressure of the refrigerant liquid. As a result, a large quantity of refrigerant liquid is discharged via outlet hole 21b' and liquid outlet passageway 21b.

The seal means is a bellows 25 having an excellent sealing performance and an excellent expansion in Y-axis direction.

Preferably, since the upper portion of valve housing 21 is affected by a high pressure while the lower portion thereof is not affected by a high pressure, bellows 25 is fixed to the lower portion of valve housing 21 using an epoxy band.

The driving means includes a step motor, i.e., a means for generating a power, a gear train for transmitting the rotating force of the step motor, and a cam for moving spool 22 up and down by rotation of the cam by the gear train.

An embodiment of the driving means includes a bracket 30 which is fixed to the bottom surface of valve housing 21 using a common fixation means like bolts, a step motor 31 which is fixed onto the upper surface of bracket 30 using a common fixation means like bolts and has a rotation shaft 31a which penetrates through bracket 30 so as to be protruded downward, a first gear 41 which is fixed to rotation shaft 31a of step motor 31, second and third gears 42 and 43 which are linked rotatably to supporting shafts 32 and 33 fixed at both sides of bracket 30, respectively, a cam 44 which is formed integrally with third gear 43 and of which periphery contacts at a predetermined portion thereof the bottom surface of bellows 25, and a cam position sensing means which senses the rotation of cam 44 so as to control step motor 31.

First gear 41 is a worm gear, second gear 42 is a large gear 42a and a small gear 42b of which diameter is different, and a third gear 43 is formed of a spur gear. First gear 41 is always engaged with large gear 42a, i.e., a worm wheel of second gear 42, and small gear 42b of second gear 42 is always engaged with third gear 43.

Cam 44 which is formed integrally with third gear 43 has a minor axis portion 44a having the shortest radius and a major axis portion 44b having the longest radius. Spool 22 which contacts the periphery of cam 44 is capable of moving up and down by the radius difference.

Preferably, either the periphery of cam 44 or the bottom surface of bellows 25 which contacts the periphery of cam 44 is coated with $MOS_2$ so as to reduce the friction factor therebetween.

Step motor 31 is also referred to as a stepping motor or a pulse motor, and is characterized in that rotation shaft 31a rotates in a step shape. For example, if one pulse is given to a driving circuit, rotation shaft 31a rotates by one step, that is, 1.8° (i.e., 360/200) in step motor 31 having 200 pulses per one rotation. Therefore, step motor 31 controls the rotation angle of rotation shaft 31a according to the given pulses. In addition, the rotation speed is controlled by a pulse frequency (i.e., a digital signal), and the driving circuit operates in digital, which allows an easy combination with microcomputers.

The cam position sensing means includes a sensing switch 50 which is fixed to a predetermined portion of bracket 30 using a common fixation means like bolts, and a projection plate 52 which is formed on third gear 43 towards the bracket and operates sensing switch 50 as third gear 43 rotates.

Sensing switch 50 has a sensing plate 51 which is in contact with projection plate 52.

Projection plate 52 may be formed at the lower periphery of cam 44.

Figure 4:
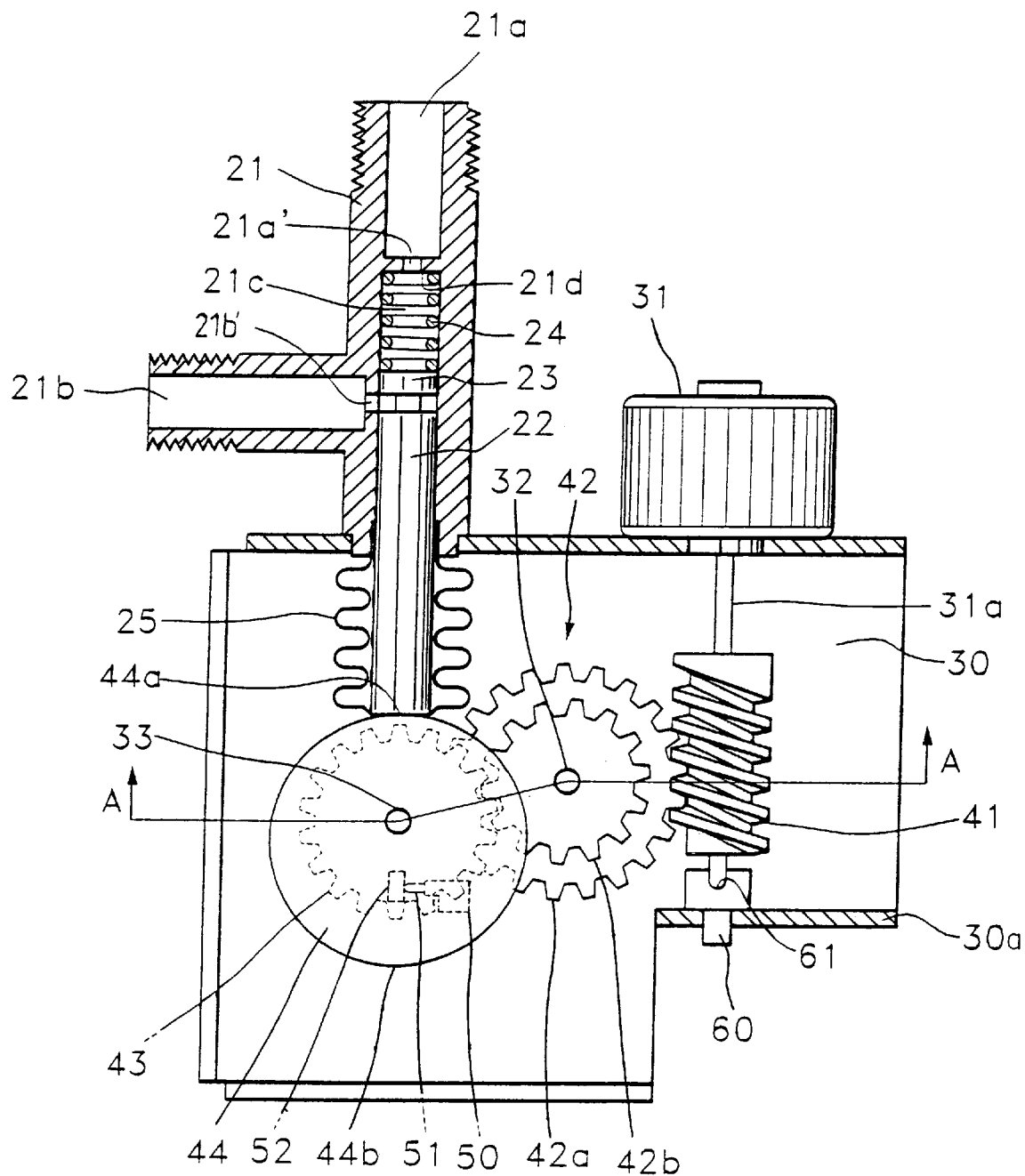
FIGS. 4 and 5 illustrate the construction and operation of a flow control valve according to the present invention.

Sensing switch 50 serves to sense the position of cam 44, that is, sensing switch 50 confirms the initial starting point of cam 44, when spool 22 is completely opened. As shown in FIG. 4, when spool 22 is completely lowered so as to completely open the valve, projection plate 52 of third gear 43 is in contact with sensing plate 52 of sensing switch 50, thereby stopping step motor 31.

As described above, rotation shaft 31a is rotated according to the amount of stepping of step motor 31 based on the state where projection plate 52 is in contact with sensing plate 51 when spool 22 is completely lowered, to thereby rotate cam 44 by a predetermined angle.

To re-work the flow control at a state where cam 44 is rotated by a predetermined angle, cam 44 is inversely rotated in such a manner that projection plate 52 is in contact with sensing plate 52, and pulses for a desired angle are generated, to thereby rotate rotation shaft 31a by a predetermined angle.

Bracket 30 has at a lower portion thereof a bent portion 30a to which a shaft guide 61 for supporting rotation shaft 31a of step motor 31 to prevent first gear 41 from being pushed, is fixed.

The driving means is not limited to the type explained above, and any driving means having a construction for effectively ascending and descending spool 22 using step motor 31 can be adopted.

The flow control valve of the present invention operates as follows.

FIG. 4 illustrates the maximum open state of the valve, wherein bellows 25 combined with spool 22 is in contact with minor axis portion 44a of cam 44, at the bottom surface thereof. Accordingly, spool 22 is lowered along guide space 21c of valve housing 21 and does not interrupt the way of outlet hole 21b' from which the refrigerant liquid flows out.

As described above, the refrigerant liquid which flows into inlet hole 21a; via liquid inlet passageway 21a by the lowering of spool 22, flows downward passing through liquid passage groove 23a formed at the periphery of spool guide 23, and is discharged to the outside of valve housing 21 through outlet hole 21b'.

At this time, spool 22 is pressed by the resilience of compression coil spring 24 and the pressure of the refrigerant liquid, which prevents spool 22 from being raised.

At such a state, if the quantity of the refrigerant liquid is desired to be decreased, rotation shaft 31a rotates according to the amount of steps of step motor 31 when a power is applied to step motor 31. The power from rotation shaft 31a is sequentially transmitted in the order of first gear 41, large gear 42a of second gear 42, small gear 42b, and third gear 43. Then, third gear 43 rotates by a predetermined angle, to thereby rotate cam 44 which is formed integrally with third gear 43.

Then, spool 22 of bellows 25 supported by the periphery of cam 44 is elevated overcoming the resilience of compression coil spring 24 and the pressure of the refrigerant liquid, which gradually closes outlet hole 21b' of valve housing 21. As a result, an overall quantity of the refrigerant liquid is decreased.

Figure 5:
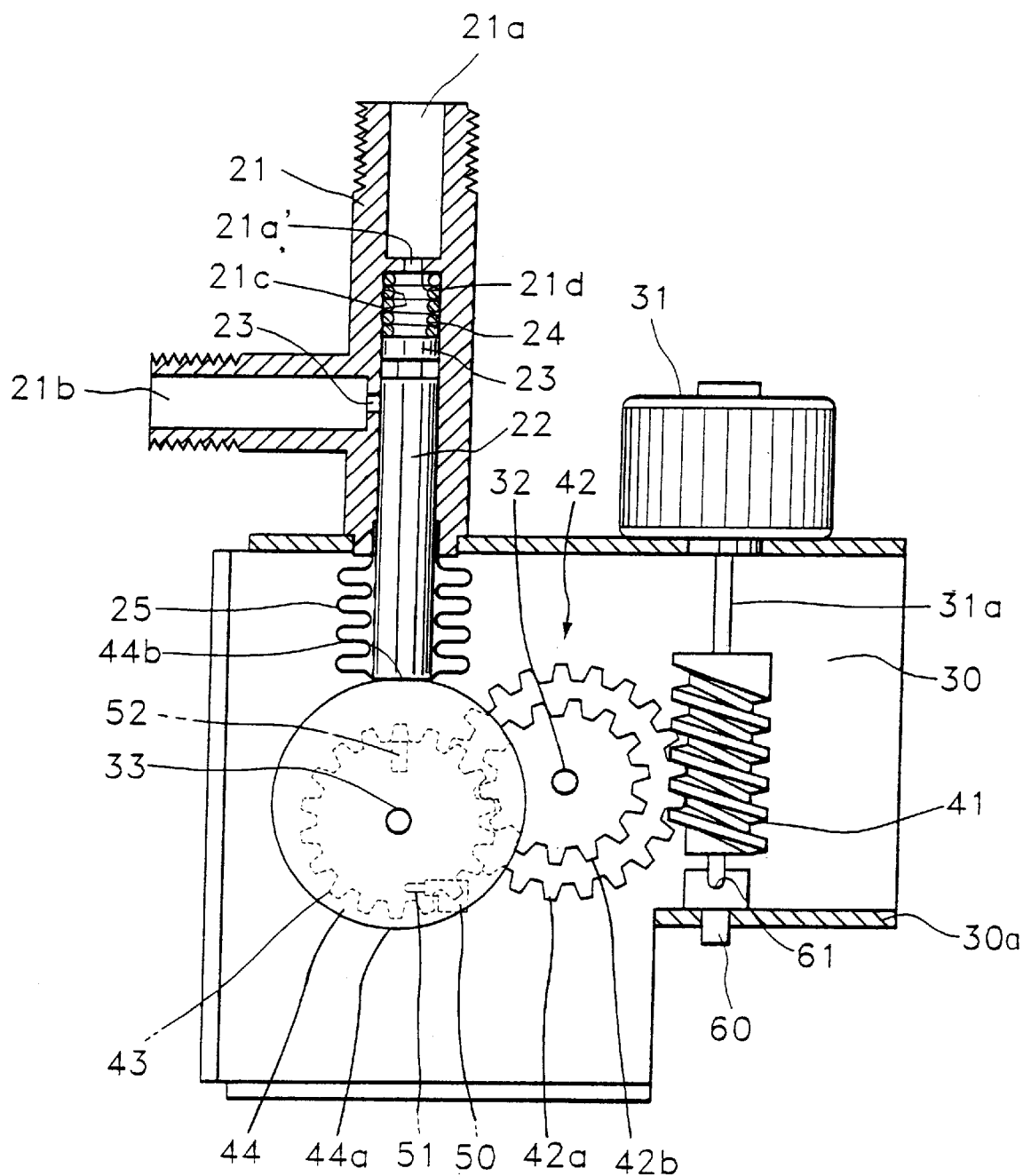
Figure 6:
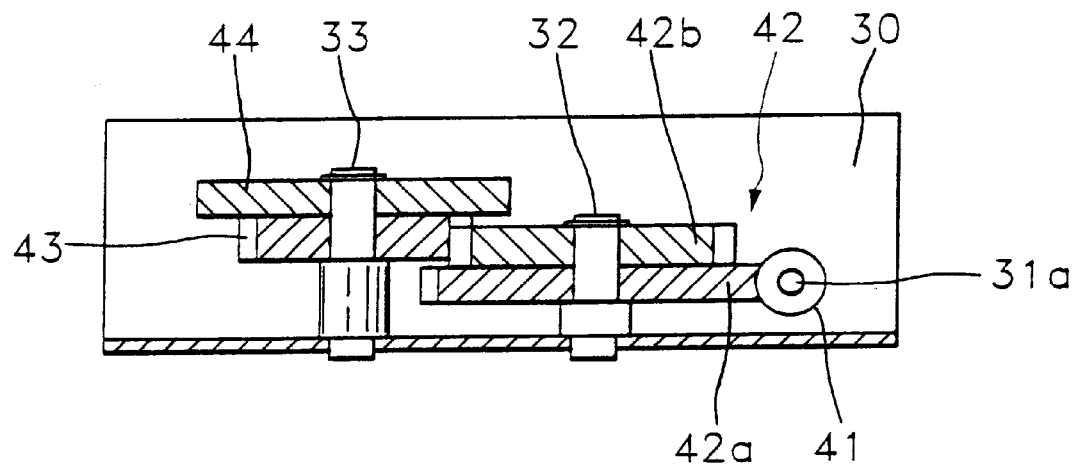
FIG. 6 is a section view taken along the line of A—A of FIG. 4.
Figure 7:
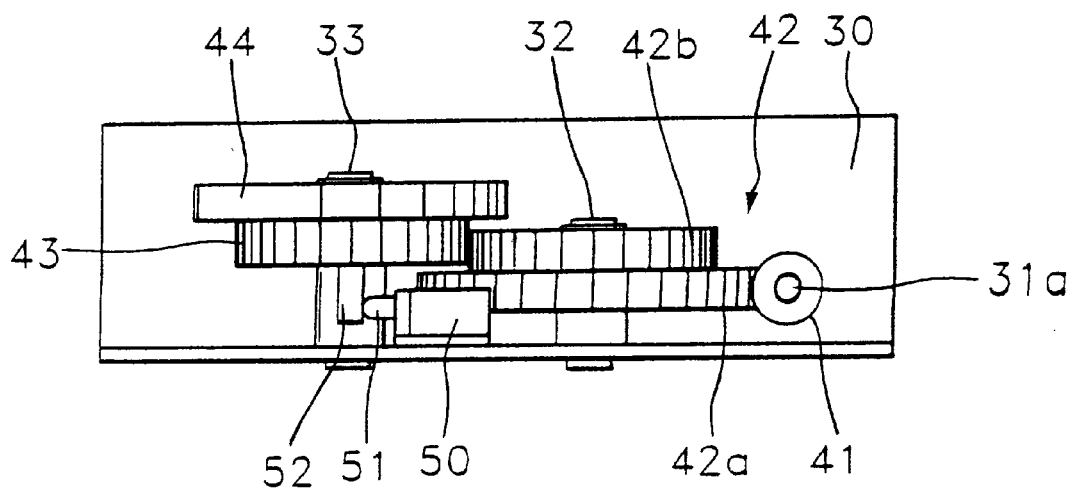
FIG. 7 is a bottom view of the flow control valve according to the present invention.

FIG. 5 illustrates a state where cam 44 rotates by 180° as compared with the initial starting point thereof and spool 22 is in contact with major axis portion 44b. Then, spool 22 is raised along guide space 21c, to thereby completely close outlet hole 21b'.

When the quantity of the refrigerant liquid is to be controlled at a state where cam 44 is rotated by a predetermined angle as compared with the initial starting point as shown in FIG. 4, an inverse direction signal is applied to step motor 31, which rotates third gear 43 in the reverse direction. At the moment projection plate 52 of third gear 43 contacts sensor plate 51 of sensing switch 50, step motor 31 stops its operation.

Then, pulses for a desired angle are generated to step motor 31 thereby rotating rotation shaft 31a by a predetermined angle. As a result, rotation angle of cam 44 is controlled, and the quantity of the refrigerant liquid is adjusted.

As described above, the flow control valve of the present invention includes the valve housing having the liquid inlet and outlet passageways and the guide space which is communicated with the liquid inlet and outlet passageways, the spool which is connected to be movable up and down to the guide space of the valve housing 21 and which controls the degree of the openness of the liquid outlet passageway, the spool guide which is accommodated into the upper portion of the guide space and moves up and down together with spool so as to flow downward the refrigerant liquid, the supporting means which elastically supports the spool guide, the seal means which is connected to the lower end portion of the valve housing, wrapping around the lower portion of the spool, so as to prevent a leakage of the refrigerant liquid, and the driving means having the step motor for moving up and down the spool.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. A flow control valve comprising:
   a valve housing having liquid inlet and outlet passageways, and a guide space which is communicated with said liquid inlet and outlet passageways;
   a spool which is connected to be movable up and down with respect to said guide space of said valve housing so as to control an openness of said outlet passageway;
   a spool guide which is accommodated in an upper portion of said guide space so as to allow a flow of refrigerant liquid downward by being moved together with said spool;
   an elastic support which elastically supports said spool guide in one direction;
   a seal member which is connected to a lower end portion of said valve housing, wrapping around a lower portion of said spool, so as to prevent a leakage of the refrigerant liquid; and
   a driving mechanism, which includes a step motor, which moves said spool up and down.

2. The flow control valve according to claim 1, wherein said spool guide has at a periphery thereof a plurality of refrigerant liquid passage grooves.

3. The flow control valve according to claim 1, wherein said spool guide at a medial portion thereof a plurality of refrigerant liquid passage holes.

4. The flow control valve according to claim 1, wherein said liquid inlet passageway and said guide space of said valve housing are formed in the same axis, said liquid outlet passageway is formed perpendicularly to said guide space, and said liquid inlet and outlet passageways have at inner end portions thereof holes having diameters smaller than those of said liquid inlet and outlet passageways and which are communicated with said guide space, respectively.

5. The flow control valve according to claim 1, wherein said seal member comprises a bellows which is fixed to said lower end portion of said valve housing and wraps around said lower portion of said spool.

6. The flow control valve according to claim 5, wherein said driving mechanism further comprises:
   a bracket by which said lower end portion of said valve housing is supported,
   said step motor being fixed to a predetermined portion of said bracket;
   a first gear which is directly connected to said step motor;
   a second gear having integrally-formed large and small gears and which is connected to be rotatable to said bracket and rotates by said first gear;
   a third gear which is connected to be rotatable to said bracket and rotates by said second gear;
   a cam being formed integrally with said third gear so as to move said spool combined with said bellows; and
   a cam position sensor which senses a position of said cam.

7. The flow control valve according to claim 6, wherein at least one of the periphery of said cam or a lower surface of said bellows which contacts said periphery is coated with $MOS_2$ in order to reduce a friction factor therebetween.

8. The flow control valve according to claim 6, wherein said cam position sensor further comprises:
   a sensing switch which is fixed to a predetermined portion of said bracket; and
   a projection plate which is formed on said third gear towards the bracket and operates as said third gear rotates.

9. The flow control valve according to claim 6, wherein said bracket has at a lower portion thereof a bent portion to which a shaft guide for supporting a rotation shaft of said step motor is fixed.

10. The flow control valve according to claim 1, wherein said driving mechanism further comprises a gear train for transmitting a rotation force of said step motor, and a cam member for moving said spool up and down being rotated by said gear train.

11. A flow control valve employing a step motor comprising:
    a valve housing having liquid inlet and outlet passages, and a guide space which is communicated with said liquid inlet and outlet passageways;
    a spool which is connected to be movable up and down with respect to said guide space of said valve housing so as to control an openness of said outlet passageway;
    a spool guide which is accommodated in an upper portion of said guide space so as to promote a flow of a refrigerant liquid downward by being moved together with said spool;
    means for elastically supporting said spool guide in one direction;
    means, which is connected to a lower end portion of said valve housing, wrapping around a lower portion of said spool, for preventing a leakage of the refrigerant liquid; and
    means for moving said spool up and down.

* * * * *